United States Patent
Hiroi et al.

[11] Patent Number: 5,153,750
[45] Date of Patent: Oct. 6, 1992

[54] IMAGE READING APPARATUS HAVING A CONTACT TYPE IMAGE SENSOR DEVICE

[75] Inventors: Masaki Hiroi; Ken Oikawa, both of Sendai; Koichi Haga, Miyagi, all of Japan

[73] Assignees: Ricoh Company, Ltd., Tokyo; Ricoh Research Institute of General Electronics Co., Ltd., Natori, both of Japan

[21] Appl. No.: 524,908

[22] Filed: May 18, 1990

[30] Foreign Application Priority Data

May 23, 1989 [JP] Japan ............... 1-59493[U]
May 23, 1989 [JP] Japan ............... 1-59494[U]

[51] Int. Cl.⁵ ............................................. H04N 1/04
[52] U.S. Cl. .................................... 358/496; 358/474; 358/498
[58] Field of Search ............... 358/496, 494, 482, 474, 358/498, 476, 400, 401; 355/308

[56] References Cited

U.S. PATENT DOCUMENTS

| | | | |
|---|---|---|---|
| 4,495,422 | 1/1985 | Wiggins | 358/494 |
| 4,729,036 | 3/1988 | Ikeda et al. | 358/482 |
| 4,805,032 | 2/1989 | Watanabe et al. | 358/482 |
| 4,920,431 | 4/1990 | Ogura et al. | 358/496 |
| 4,953,037 | 8/1990 | Ito et al. | 358/498 |
| 4,959,536 | 9/1990 | Ijuin et al. | 358/482 |
| 4,970,606 | 11/1990 | Shima | 358/494 |

FOREIGN PATENT DOCUMENTS

55-31662 8/1980 Japan .
58-23794 5/1983 Japan .

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

An image reading apparatus includes a contact type image sensor device optically reading the document, a platen roller pushing the document against a surface of the image sensor, a flame supporting the contact type image sensor device. The flame has a mounting surface to which the contact type image sensor device is fixed and a side wall which rise from the mounting surface in the vicinity of the contact type image sensor device. A gap is formed between the contact type image sensor device and the side wall. The image apparatus also includes a filling agent filling the gap including substantially spherical particles having an anti-friction characteristic.

24 Claims, 7 Drawing Sheets

IMAGE READING APPARATUS HAVING A CONTACT TYPE IMAGE SENSOR DEVICE

BACKGROUND OF THE INVENTION

The present invention relates to image reading apparatus that is applicable to facsimile apparatus, digital photocopier apparatus and the like, and more particularly to image reading apparatus that uses a contact type image sensor device to read a document.

Figure 1:
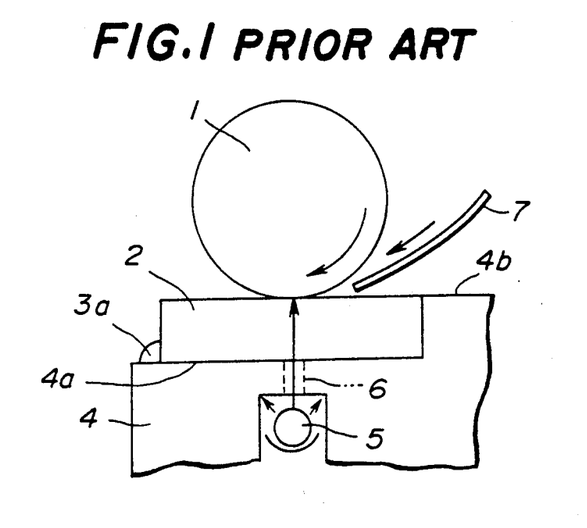
FIGS. 1 through 4 are views indicating the structure of a conventional image reading apparatus using a contact type image sensor.

FIG. 1 indicates a conventional image reading apparatus that uses a contact type image sensor.

In FIG. 1, a frame 4 has a mounting surface 4a that is one step below a surface 4b. An adhesive fixes a sensor base plate 2 of a contact type of full-size image sensor to the mounting surface 4a of this frame 4. A document 7 that is sent by conveyor system is pressed against the sensor base plate 2 by a rotating platen roller 1. Then, when the light from a light source passes through the light-receiving window 6 and is irradiated to the document 7, the contact type image sensor optically reads the document 7. In such an image reading apparatus, the width of the sensor base plate 2 is large and so the document 7 that is sent is surely fed between the platen roller 1 and the sensor base plate 2.

Figure 2:
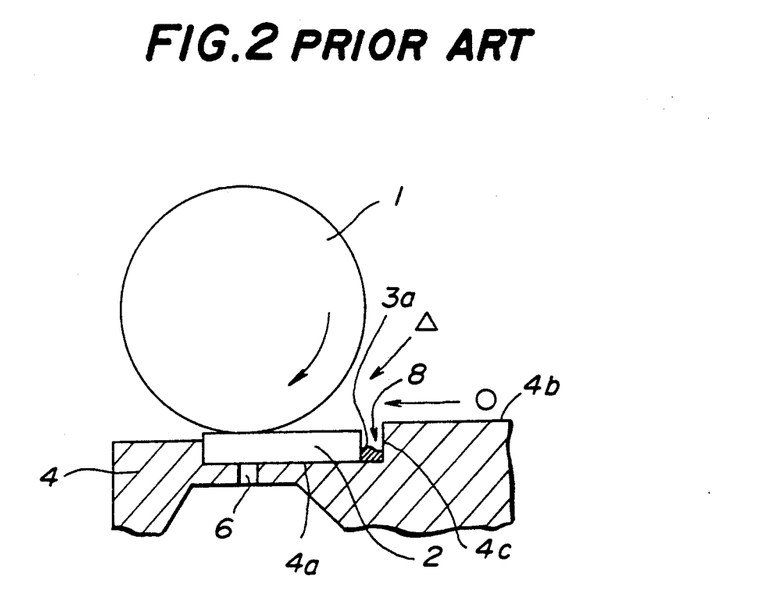

In addition, as shown in FIG. 2, an image reading apparatus is proposed, which has a gap 8 formed between the sensor base plate 2 and a side wall 4c between the surface 4b and the mounting surface 4c. In this case, the width of the sensor base plate 2 is relatively large and so the width of the gap 8 is small. Thus, the document that is sent from the direction indicated by the arrow (either a Δ or a ○) first strikes the sensor base plate 2 or the platen roller 1 and is then fed to between the platen roller 1 and the sensor base plate 2. The document is then conveyed in a favorable manner.

Figure 3:
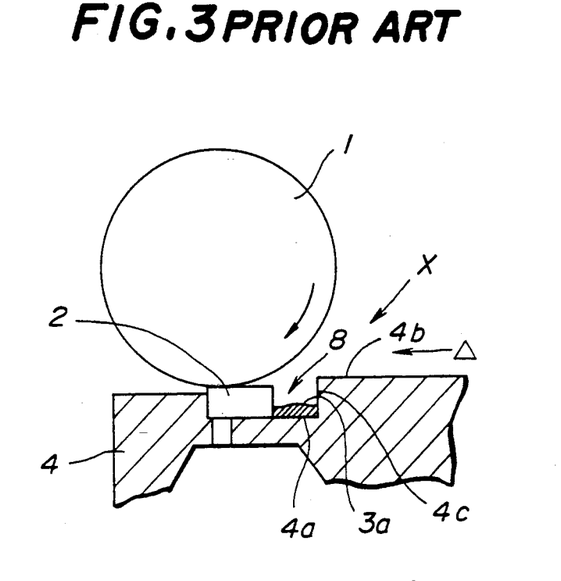

Making the width of the sensor base plate 2 smaller has been proposed in order to make image reading apparatus more compact and lower in price. In this case, as shown in FIG. 3, the width of the gap 8 formed between the sensor base plate 2 and the frame 4 becomes larger. Thus, as indicated by the arrow marked with a Δ, the document that is sent along the surface 4b of the frame 4 enters between the platen roller 1 and the sensor base plate 2 but a document that is sen from the direction indicated by the arrow marked with an X enters the gap 8 and therefore results in the frequent occurrence of paper jams.

Figure 4:
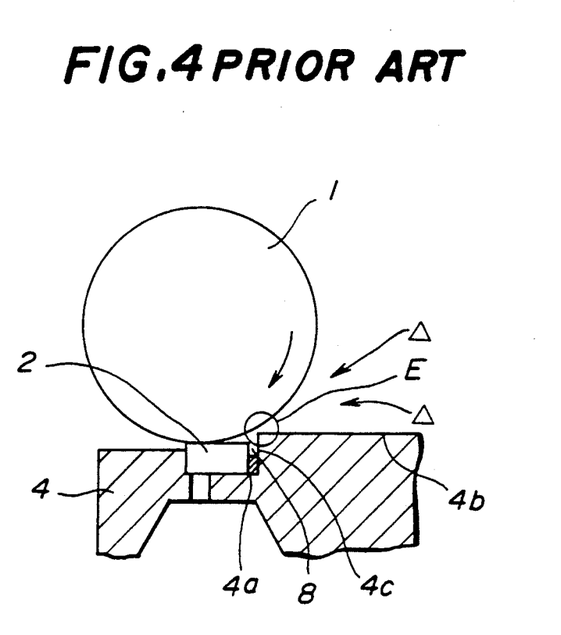

In order to prevent paper jams such as this, it is possible to have, as indicated in FIG. 4, a reduced width for the gap 8 so that the contact edge portion (E) for the surface 4b of the frame 4 and the side wall 4c is made closer to the platen roller 1. However, in such a structure, a gap between the contact edge portion (E) and the platen roller 1 either practically disappears or contacts so that the document is caught between the contact edge portion (E) and the platen roller 1 so that an extra load is created when the document is conveyed. The presence of such a load also makes it more likely for a paper jam to occur.

Furthermore, it has been proposed (Japanese Publication No.31662-1890) to provide a pressure plate at a position in contact with a document feed roller and to have a document feed mechanism that scans the document in the vicinity of a distal end portion of this pressure plate. Also proposed (Japanese Patent Publication No.23794-1983) has been a scan and read mechanism in which the document is fed to between a rotating pressure rubber roller and a guide member that presses the rubber roller, so that the document will be always fed smoothly even if such mechanisms are used.

SUMMARY OF THE INVENTION

Accordingly, a general object of the present invention is to provide a novel and useful image reading apparatus using a contact type image sensor, in which the disadvantages of the aforementioned prior art are eliminated.

A more specific object of the present invention is to provide an image reading apparatus using a contact type image sensor, and in which paper jams are difficult to occur when the document is fed, and for which the manufacture is simple and inexpensive.

The above objects of the present invention can be achieved by an image reading apparatus comprising a contact type image sensor device being in contact with a document fed by a conveyor system and optically reading the document, a platen roller pushing the document against a surface of the image sensor, a frame supporting the contact type image sensor device, the frame having a mounting surface to which the contact type image sensor device is fixed and a side wall which rises from the mounting surface in the vicinity of the contact type image sensor device on the side on which the document is fed to the contact type image sensor device, a gap being formed between the contact type image sensor device and the side wall, and a filling agent filling the gap including substantially spherical particles having an anti-friction characteristic.

The above objects of the present invention can be also achieved by an image reading apparatus comprising a contact type image sensor device being in contact with a document fed by a conveyor system and optically reading the document, a platen roller pushing the document against a surface of the image sensor, a frame supporting the contact type image sensor device, the frame having a mounting surface to which the contact type image sensor device is fixed and a side wall which rises from the mounting surface in the vicinity of the contact type image sensor device on the side on which the document is fed to the contact type image sensor device, a gap being formed between the contact type image sensor device and the side wall, and a thin plate guiding the document so as to feed the document into between the platen roller and the contact type image sensor device from above a surface of the contact type image sensor device, a distal end of the thin plate being positioned above the gap.

Other objects and further features of the present invention will be apparent from the following detailed description when read in conjunction with the accompanying drawing.

DESCRIPTION OF THE PREFERRED EMBODIMENTS

Figure 5:
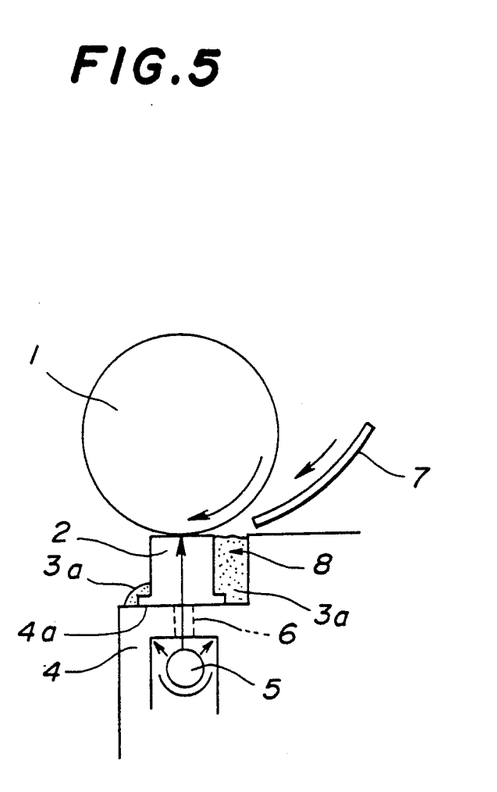
FIG. 5 is a view indicating an example of the structure of an image reading apparatus using a contact type image sensor.
Figure 6:
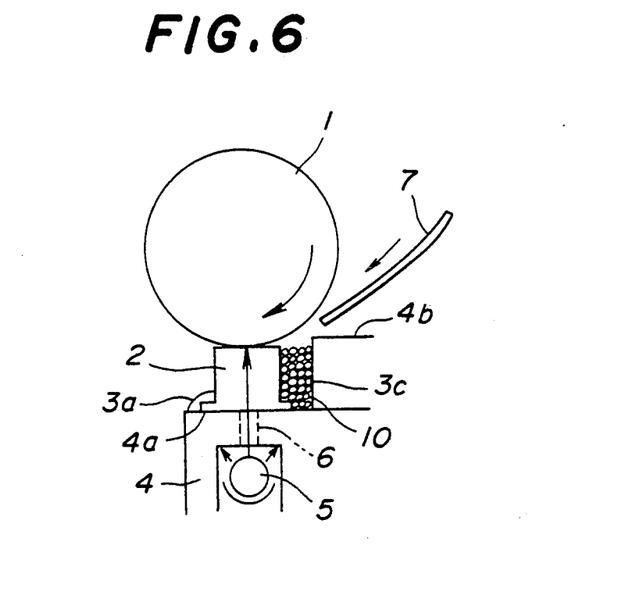
FIG. 6 is a view indicating a first embodiment of an image reading apparatus using a contact type image sensor, and according to the present invention.
Figure 7:
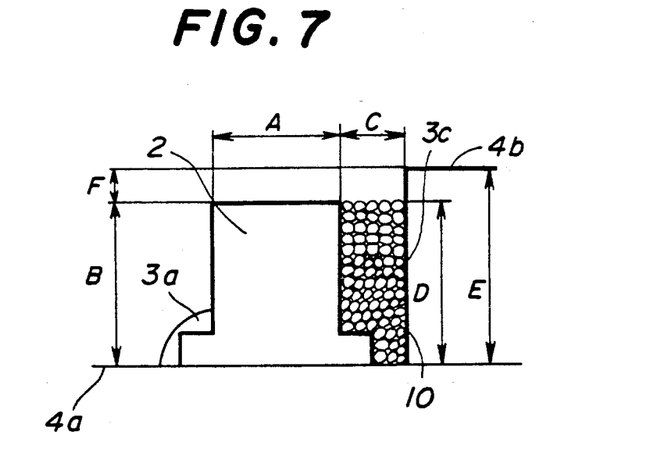
FIG. 7 is an enlarged view of the major portions of the apparatus indicated in FIG. 6.

First of all, as shown in FIG. 5, a filler material is placed in the gap 8 between the frame 4 and the contact type image sensor, so that filling this gap enables the prevention of paper jams. For example, it is possible to use an adhesive 3a to fill the gap 8 and therefore fix the sensor base plate 2 to the mounting surface 4a of the frame 4. However, the adhesive that adheres the sensor base plate 2 and the frame 4 is generally of the rubber type, the epoxy type or the acryl type and when such adhesives have hardened, their hardness is generally in the range of Shore hardness $Hs=80$. This is low when compared to the hardness of silica borate glass (Knoop hardness $Hk=375$) or quartz ($Hk=800$). Accordingly, the surface of the filler material is worn away when many documents 7 pass over it. Because of this, by mixing substantially spherical particles that have a hardness of that of silica borate or more, in to the adhesive that is used to fill the gap 8 enhances the wear resistance of the filler material in the gap 8 and also prevents paper jams. The spherical substance that is mixed in with the adhesive should desirably by AlN, TiN, $Si_3N_3$, quartz or some other inorganic material having a Knoop hardness of 300 or more. Furthermore, in this case, a mixing ratio of 2 to 4 parts adhesive (by volume) to 1 part of spherical substance is appropriate. In addition, when a material having electroconductivity is selected as the filler material, it is also possible to prevent electrostatic charging with respect to the document. Still furthermore, when a material having a light absorbing characteristic or a light reduction characteristic is selected as the filler material, it is also possible to control stray light caused by reflected light noise at the side walls of the sensor base plate 2. Filling the gap 8 with an adhesive by the normal injection method requires that the width of the gap 8 be generally 0.8 mm or more. Accordingly, the diameter of the spherical substance can be 0.8 mm or less. However, practically speaking, considering that the upper surface of the filler material must be relatively uniform and because it is better for reasons of cost and workability to mix the adhesive and the spherical substance and the fill them together using the injection method rather than separately, a diameter of 0.001 to 0.1 mm is appropriate for the spherical substance. Furthermore, by making the substance spherical, it is also possible to reduce the coefficient of friction.

The following is a description of a first embodiment according to the present invention, with reference to FIGS. 1 and 2. FIG. 2 indicates an example of the relationship of positions between the sensor base plate 2, and the frame 4 and gap 8 of FIG. 1. In FIG. 2, the width (A) of the sensor base plate 2, the height (R) of the sensor base plate 2, the width (C) of the gap 8, the height (D) of the filler material, the distance (E) between the surface 4b and the mounting surface 4a of the frame 4, and the difference (F) between the distance (E) and the height (B) of the sensor plate 2 are determined as follows.

| | |
|---|---|
| A = 2.5 mm | B = 1.6 mm |
| C = 1.0 mm | D = 1.6 mm |
| E = 1.7 mm | F = 0.1 mm |

After incomplete cutting is performed in a basic material so that predetermined grooves are formed in the basic material, the sensor base plate 2 is separated from the basic material by mechanical breaking along the grooves. The light-receiving window 6 and the optical axis of the contact type image sensor are brought into alignment with the mounting surface 4a of the frame 4 which is made of aluminum and the sensor base plate 2 is fixed by adhesive 3b. This adhesive 3b is for example, an epoxy resin type of adhesive.

Nickel epoxy adhesive 3c (black in color and with an electrical resistivity of $0.020\Omega.cm$) has spherical glass bead material ($\phi 80$ to 149 $\mu$) mixed in with it and agitated, and an injector is used to inject the mixture into the gap 8 formed between the sensor base plate 2 and the frame 4. The mixing ratio of the adhesive 3c and the spherical material 10 (glass beads) is 2:1 (by volume). The mixture is filled to the same height as the surface of the sensor base plate 2. In addition, the upper surface of the sensor base plate 2 is provided with a step (F) of approximately 100 $\mu m$ with the surface 4b of the frame 4. Paper jams and paper misfeeds occur if a projection from a surface to which the conveyed document is contact is approximately 100 $\mu m$ or more so that the step (F) is intentionally formed from the point of view of processing precision of the sensor base plate 2 and the stress which occurs when the sensor base plate 2 is processed.

Table 1 indicates the results of a test for document feed in an image reading apparatus having a structure as has been described above. F1 is the test results for an image reading apparatus having the conventional structure indicated in FIG. 3. F2 is the test results for an image reading apparatus having the structure that has been described above. Moreover, the numerical values in Table 1 indicate the number of sheets that jammed when 500 originals were conveyed.

| | |
|---|---|
| Roller material | NBR (Acrylonitrile-Butadiene Copolymer Rubber) |
| Roller hardness | 40 (degree) |
| Roller weight | 1.5 kg |
| Document material | A4 PPC paper (thickness: approx. 85 $\mu m$) |

TABLE 1

| | F1(for comparison) | F2(this proposal) |
|---|---|---|
| Jam occurence ratio | 11/500 | 0/500 |

By this, it was confirmed that the jam occurrence ratio can be held down. In addition, there was no observation of wear for either the adhesive or the glass beads. In the case where the image reading apparatus having the structure described above is used in a facsimile apparatus or a digital photocopier, it is possible to practically eliminate the occurrence of paper misfeeds and jams when the document is conveyed.

In the test described above, if the electrical resistivity of the nickel epoxy adhesive 3c is 0.02Ω.cm. then, when the electrical resistivity of the adhesive filled in the gap 8 is less than or equal to $10^8$Ω.m, there is also the effect of eliminating static charging with respect to the documents, it is desirable that the electrical resistivity of the spherical material 10 mixed in with the adhesive also be $10^8$Ω.m.

In addition, in the test described above, the adhesive 3c is black in color and has a light absorbing property so that reflected light noise from the adhesive 3c is prevented. The adhesive 3c can be a substance that has a light reduction property that attenuates external light and therefore prevents reflected light noise. From the point of view of the prevention of reflected light noise, it is desirable that the spherical material 10 also be of a material with either a light absorbing or a light reduction property.

The following is a description of an example of an image reading apparatus in which an original is fed along a guide and to between the platen roller and the sensor plate. In this case, a favorable effect is obtained if the ratio of the diameter of the platen roller and the width of the sensor base plate is within a certain range.

Figure 8:
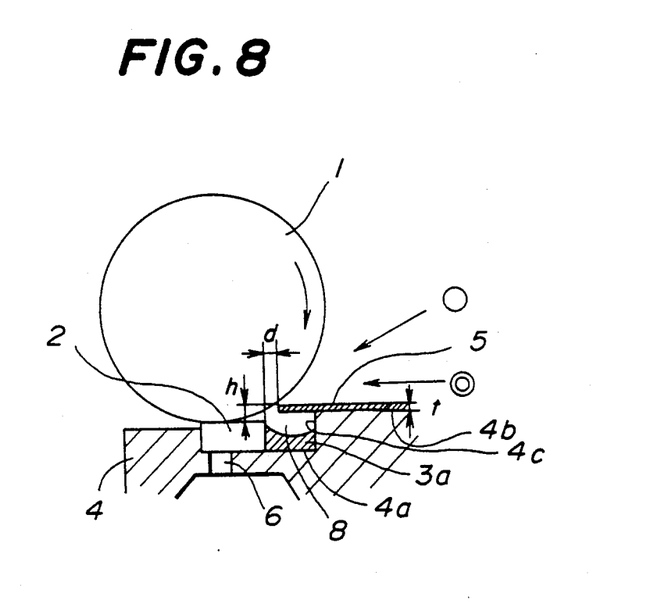
FIG. 8 is a view indicating a second embodiment of an image reading apparatus using a contact type image sensor, and according to the present invention.

FIG. 8 indicates an outline diagram of an image reading apparatus according to the present invention. In FIG. 8, the sensor base plate 2 is fixed by the adhesive 3a to the mounting surface 4a. There are no particular specifications for the adhesive 3a as long as it is an adhesive that has a certain degree of flexibility.

A thin plate 5 is fixed by either an adhesive or an adhesive double coated tape to a surface 4b of a frame 4. The material of the thin plate 5 can generally be metal, or phosphorous copper, berrylium copper, SUS, or an amorphous metal or the like.

When these are used, the gap (d) between the sensor base plate 2 and the thin plate 5 is d=0.1 to 1 mm, the step difference (h) between the surface of the thin plate 5 and the surface of the sensor base plate 2 is h= +0.1 to +0.5 mm, and the thickness (t) of the thin plate 5 is t=10 to 500 μm. It is desired that d=0.1 to 0.5 μm, h=0.1 to 0.5 μm and t=20 to 100 μm.

In FIG. 8, the optical axis of the contact type full-size image sensor on the sensor base plate 2 and the center of the light-receiving window 6 are in alignment. Then, the arrow marked with a ◯ and the arrow marked with a ◉ indicate the directions of feed (angles of entry) of the respective documents. ◦ indicates that a document is properly fed and ◉ indicates that the document feed is performed extremely well. As can be assumed from this, in FIG. 4, arrows that are marked with a X indicate that a document was not fed well and arrows marked with a Δ indicate that the document was fed extremely poorly. By providing the previously mentioned thin plate 5, it is easier for the document to enter between the platen roller 1 and the sensor base plate 2 and there is practically no entry of the paper into the gap 8 between the sensor base plate 2 and the frame 4. In addition, even if the thin plate 5 is in the vicinity of or in contact with the platen roller 1, the flexibility of the thin plate 5 means that the distal end of the thin plate 5 bends a certain degree in the direction of the arrow S in FIG. 9 and so no great load is generated. Accordingly, the troubles that were described for FIG. 4 do not occur and the paper feed is favorably performed. Even if the document 7 has a small thickness or a large thickness, the thin plate 5 bends in accordance with the thickness of the document 7 and so there is no increase of paper jams or misfeeds even when the thickness of the document 7 is increased.

Figure 10:
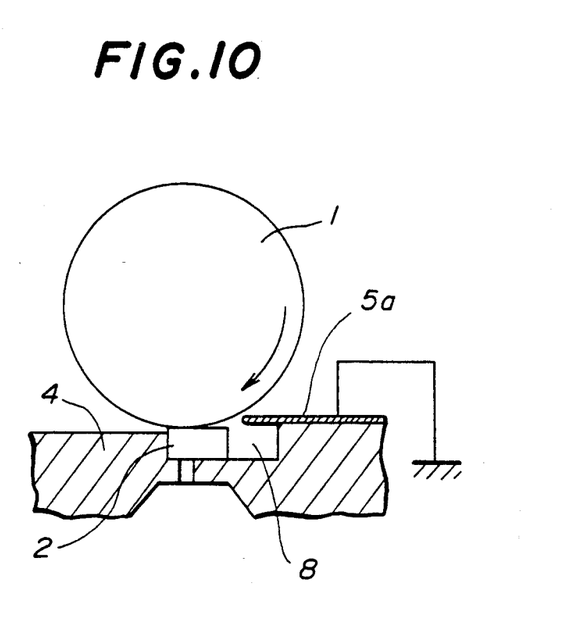
FIGS. 10 through 13 are views indicating modifications of the second embodiment of an image read apparatus using a contact type image sensor, and according to the present invention.

In addition, by the use of an electroconductive material as the material for the thin plate 5, it is possible to counter external noise and to have a static charging countermeasure. As is indicated in FIG. 10, by making the thin plate 5 electrically ground with the electroconductive material 5a, it is possible to either prevent or substantially eliminate static charging and to therefore reduce friction due to static electricity and thus provide favorable paper feed. Furthermore, since the grounded electroconductive material 5a is close to the sensor base plate 2, it is possible to prevent adverse electrical influences (such as noise and destruction, and the like) to the image sensor caused by static electricity and external noise. The thin plate 5 can comprise such the electroconductive material 5a as for example, phosphorous copper, berrylium, copper, SUS, or an amorphous metal in the case of metals. In addition, it is also possible to mix an electroconductive material (such as metal powder, carbon, metallic acid substances such as ITO, $SnO_2$ or the like) into polycarbonate resin, nylon, polyacetar resin, acryl resin or some other resin, make this resin into a plate and then form the electroconductive material 5a. Furthermore, it is also possible to obtain a thin plate 5 by coating the surface of the previously described thin plate made of the resin with an electroconductive material.

Furthermore, if the ratio of width of the sensor base plate 2 and the diameter of the platen roller 1 exceeds a certain range, then there will be an obstacle to the feeding of documents between the sensor base plate 2 and the platen roller 1.

TEST 1

In the apparatus indicated in FIG. 8, SUS304(t≅100 μm) is used as the material of the thin plate 5,
the diameter of the platen roller 1 is 18 mm,
the width of the sensor base plate 2 is 2.5 mm,
the thickness of the sensor base plate 2 is 1.6 mm,
the thickness of the document is approximately 80 μm and the h=0.15 mm.

The value for the gap (d) was changed and 500 originals were fed. The results of this test are indicated in Table 2.

TABLE 2

| d(mm) | ratio of jams/500 sheets |
|-------|--------------------------|
| 0.1   | 0/500                    |
| 0.3   | 0/500                    |
| 0.5   | 0/500                    |
| 1.0   | 1/500                    |
| 1.5   | 3/500                    |

As can be seen from Table 2, changing the value for (d) changes the ratio of paper jams. The suitable range for the value of (d) is from 0.1 to 1 mm, with the optimum range being 0.1 to 0.5 mm.

TEST 2

In the apparatus indicated in FIG. 8, SUS304 is used as the material of the thin plate 5,
the diameter of the platen roller 1 is 18 mm,
the width of the sensor base plate 2 is 2.5 mm,
the thickness of the sensor base plate 2 is 1.6 mm, the thickness of the document is approximately 80 μm and the h=0.3 mm.

The value for the thickness (6) of the thin plate 5 was changed and 500 document were fed. The results of this test are indicated in Table 3.

TABLE 3

| t(μm) | ratio of jams/500 sheets |
| --- | --- |
| approx. 20 | 0/500 |
| approx. 50 | 0/500 |
| approx. 100 | 0/500 |
| approx. 500 | 2/500 |

As can be seen from Table 3, the rigidity increases when the thickness of the thin plate 5 becomes about 500 μm and the nature of the structure becomes effectively that of the structure indicated in FIG. 4, and paper jams occur. Even if the thin plate 5 is on contact with the platen roller 1, the distal end of the thin plate 5 bends when (d) is 100 μm or less and so paper jams did not occur. From the above results of testing, a range of from 10 to 500 μm is good for the thickness (t) but the most suitable value would be dependent upon the material used for the thin plate 5.

TEST 3

In the apparatus indicated in FIG. 8, amorphous metal (t≅50 μm) is used as the material of the thin plate 5,
the diameter of the platen roller 1 is 18 mm,
the width of the sensor plate 2 is 2.5 mm, the thickness of the sensor plate 2 is 1.6 mm,
the thickness of the document is approximately 80 μm and the gap (d)=0.5 mm.

The value for the step (h) between the thin plate 5 and the sensor base plate 2 was changed and 500 documents were fed. The results of this test are indicated in Table 4.

TABLE 4

| h(mm) | ratio of jams/500 sheets |
| --- | --- |
| 0 | 12/500 |
| 0.1 | 0/500 |
| 0.2 | 0/500 |
| 0.3* | 0/500 |
| 0.5* | 0/500 |

*The asterisk indicates that the thin plate 5 is in contact with the platen roller 1.

As can be seen from Table 4, if the step (h) between the surface of the thin plate 5 and the sensor base plate 2 is greater than 0.1 mm, then paper misfeeds of the type that was described for FIG. 4 do not occur even if the thin plate 5 is in contact with the platen roller 1. The reason why paper jams occur is thought to be that when h=0 mm is that when an original is fed, the thin plate 5 bends by approximately the thickness of the document 7 and the surface of the sensor base plate 2 becomes higher than the surface of the thin plate 5 and the document strikes the side of the sensor base plate 2.

TEST 4

In the apparatus indicated in FIG. 8, amorphous metal (t≅50 μm) is used as the material of the thin plate 5,
the diameter of the platen roller 1 is 18 mm,
the width of the sensor plate 2 is 2.5 mm, the thickness of the sensor plate 2 is 1.6 mm,
the gap (d)=0.5 mm and h=0.3 mm.

The thickness of the document was changed and 500 documents were fed for each value. In addition, similar results to those in Table 5 were obtained when the test was performed without the thin plate 5, for the status indicated in FIG. 4 (where d=0.5 mm, h=0.2 mm). The results of this test are indicated in Table 5.

TABLE 5

| Thickness (μm) | Jam ratio/500 (with thin plate) | Jam ratio/500 (without thin plate) |
| --- | --- | --- |
| approx. 50 | 0/500 | 0/500 |
| approx. 80 | 0/500 | 1/500 |
| approx. 100 | 0/500 | 7/500 |

As can be seen in Table 5, when the thin plate 5 is used, the distal end of the thin plate 5 bends a certain degree while the document is being fed and this lessens the load and enables favorable feed to be performed.

TEST 5

In the apparatus indicated in FIG. 8, SUS304 (t≅100 μm) is used as the material of the thin plate 5,
the width of the sensor base plate 2 is 2.5 mm,
the thickness of the sensor base plate 2 is 1.6 mm,
the gap (d)=0.5 mm and h=0.2 mm.

The value for the diameter of the platen roller 1 was changed and 500 documents were fed for each value. The results of this test are indicated in Table 6.

TABLE 6

| roller diam. | ratio of jams/500 sheets |
| --- | --- |
| φ10 | 0/50 |
| φ18 | 0/500 |
| φ20 | 0/500 |
| φ25 | 0/500 |
| φ30 | 21/500 |

As can be seen from Table 6, if the diameter of the platen roller 1 with respect to the 2.5 mm width of the sensor base plate 2 is in the range of 10 to 25 mm, then it is possible to have favorable feed. This is to say that there is favorable feed when the ratio between the width of the sensor base plate 2 and the platen roller 1 is between 1:4 and 1:10.

Figure 9:
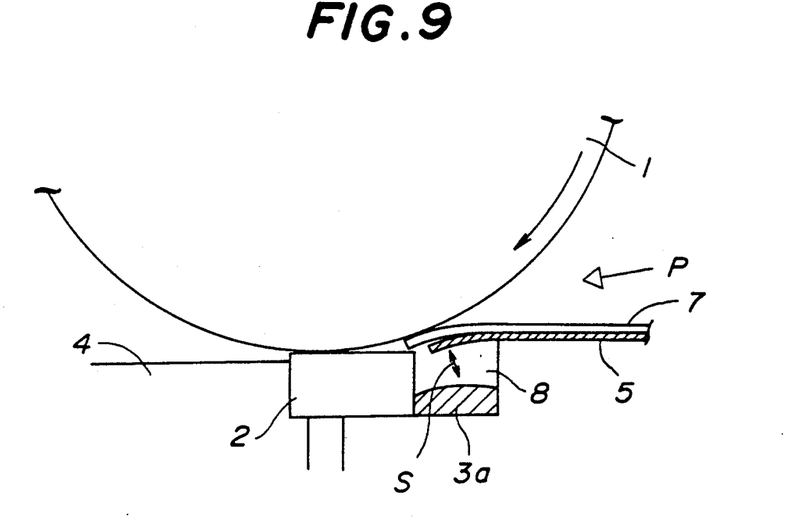
FIG. 9 is an enlarged view of the major portions of the apparatus indicated in FIG. 8.

According to the image reading apparatus indicated in FIGS. 8 and 9, the thin plate 5 forms a guide for the feeding of the documents and therefore makes it possible to realized favorable document feed. In addition, if as indicated in FIG. 10, the thin plate 5 is formed of an electroconductive materials and is grounded, then the thin plate 5 will function as a shield plate and the electrical characteristics of the image sensor will be improved.

Figure 11:
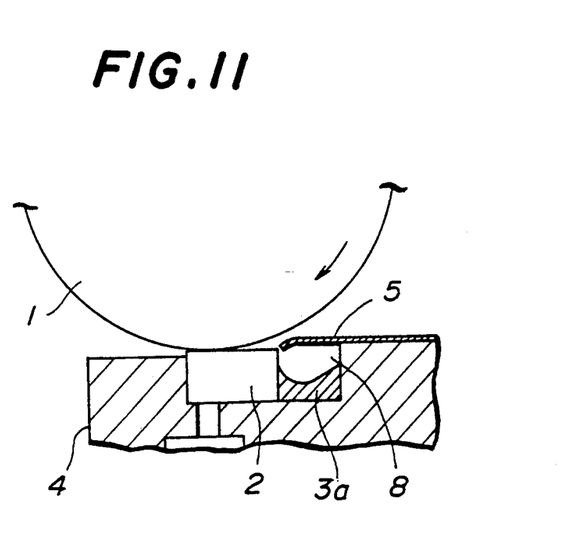

FIG. 11 indicates an image reading apparatus that has a curve in the distal end of the thin plate 5 so that marks are not made to the documents that are conveyed. In the same manner, FIG. 12 indicates an image reading apparatus having a structure in which the edge on the upper surface of the distal end of the thin plate 5 is chamfered so that marks are not made to the document.

TEST 6

Figure 12:
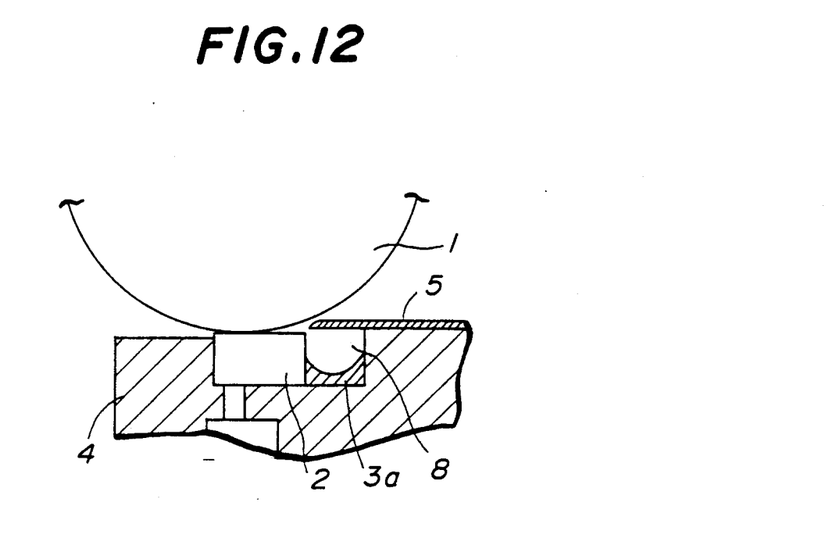

In the apparatus indicated in FIGS. 11 and 12,
SUS304 (t≅100 μm) is used as the material of the thin plate 5,
the diameter of the platen roller 1 is 18 mm,
the width of the sensor base plate 2 is 2.5 mm,
the thickness of the sensor base plate 2 is 1.6 mm,
the thickness of the document is approximately 150 μm,
1 h=03 mm and the gap (d)=0.1 mm.

The amount of curve of the distal end of the thin plate 5 was changed and 10 documents were fed for each value. The amount of the curve in the distal end of the thin plate 5 is expressed by the radius R. Then, the curve when R=0.1 and R=0.2 is, as indicated in FIG. 12, obtained by chamfering the surface of the edge at the distal end of the thin plate 5. Black colored printing paper was used for the document so as to make marks more easily visible. The results of this test are indicated in Table 7.

TABLE 7

| R(mm) | The amount of marks across a 10 mm width. |
| --- | --- |
| 0.1 | 32 |
| 0.5 | 10 |
| 2 | 3 |
| 5 | 2 |
| 8 | 8 |
| 10 | 6 |

As can be seen from Table 7, curving the distal end of the thin plate 5 within the range of R=2 mm to R=10 mm, provides favorable original feed from the point of view of marks to the original and in terms of ease of feed. The range of R=2 mm to R=5 mm is particularly favorable.

Figure 13:
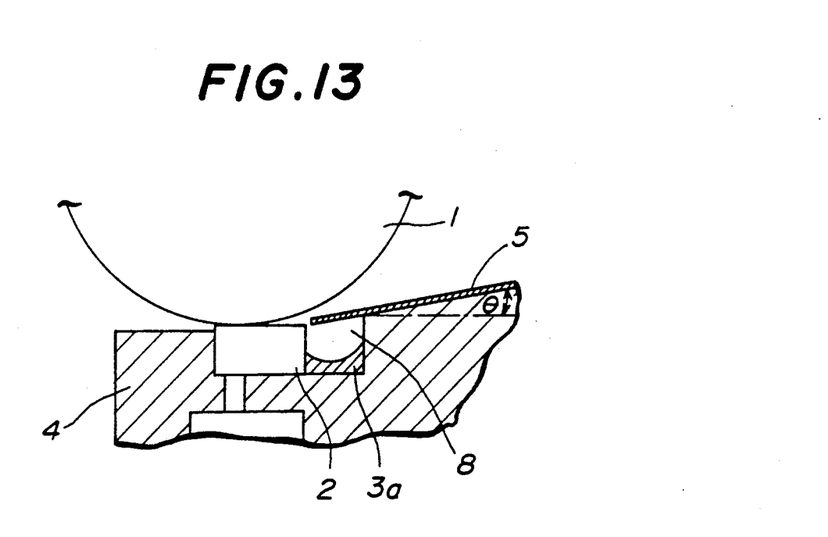

As is indicated in FIG. 13, the feed load upon the document is reduced when the thin plate 5 is inclined at an angle θ with respect the surface of the sensor base plate 2 and the amount of marks made to the document is also reduced.

TEST 7

In the apparatus indicated in FIG. 13, SUS304 (t≅100 μm) is used as the material f the thin plate 5,
the diameter of the platen roller 1 is 18 mm,
the width of the sensor base plate 2 is 2.5 mm,
the thickness of the sensor base plate 2 is 1.6 mm,
the thickness of the (black colored printing paper) original is approximately 150 μm, and
the gap (d)=0.1 mm.

The degree of the angle of the thin plate 5 was changed and 10 documents were fed for each value. The results of this test are indicated in Table 8.

TABLE 8

| Angle θ | No. of sheets with marks across a 10 mm width. |
| --- | --- |
| 0° | 6 |
| 1° | 5 |
| 3° | 3 |
| 5° | 4 |
| 7° | 10 |
| 10° | 9 |
| 20° | 18 |

As can be seen from Table 8, there is favorable document feed when the angle of inclination θ of the thin plate 5 is within a range of 0° to 10° and that this is also favorable from the view of the generation of marks. A range from 0° to 5° is particularly desirable.

The present invention is not limited to the aforementioned embodiments, and variations and modifications may be made without departing from the scope of the claimed invention.

What is claimed is:

1. An image reading apparatus comprising:
   a contact type image sensor device being in contact with a document fed by a conveyor system and optically reading said document;
   a platen roller pushing said document against a surface of said image sensor;
   a frame supporting said contact type image sensor device, said frame having a mounting surface to which said contact type image sensor device is fixed and a side wall which rises from said mounting surface in the vicinity of said contact type image sensor device on the side on which said document is fed to said contact type image sensor device, a gap being formed between said contact type image sensor device and said side wall; and
   a filling agent filling said gap and including substantially spherical particles having an anti-friction characteristic.

2. An image reading apparatus as claimed in claim 1 wherein said filling agent is a mixture of adhesive and substantially spherical particles.

3. An image reading apparatus as claimed in claim 2 wherein the volumetric ratio of said adhesive and said substantially spherical particles in said mixture is from 2 to 4 parts of said adhesive with respect to one part of said spherical particles.

4. An image reading apparatus as claimed in claim 2 wherein said adhesive has electroconductivity.

5. An image reading apparatus as claimed in claim 4 wherein said adhesive has a electrical resistivity of $10^8 \Omega.m$ or less.

6. An image reading apparatus as claimed in claim 2, wherein said substantially spherical particles have electroconductivity.

7. An image reading apparatus as claimed in claim 6 wherein said substantially spherical particles have an electrical resistivity of $10^8 \Omega.m$ or less.

8. An image reading apparatus as claimed in claim 2 wherein said adhesive has at least one of a light absorbing characteristic or a light attenuation characteristic.

9. An image reading apparatus as claimed in claim 8 wherein said adhesive is black in color.

10. An image reading apparatus as claimed in claim 8 wherein said substantially spherical particles are black in color.

11. An image reading apparatus as claimed in claim 2 wherein said substantially spherical particles have at least one of a light absorbing characteristic or a light attenuation characteristic.

12. An image reading apparatus as claimed in claim 1 wherein said substantially spherical particles have a Knoop hardness of 300 or more.

13. An image reading apparatus as claimed in claim 1 wherein said substantially spherical particles have external diameters of from 0.001 mm to 0.1 mm.

14. An image reading apparatus as claimed in claim 1 wherein said filling agent has electroconductivity.

15. An image reading apparatus as claimed in claim 1 wherein said filling agent has at least one of a light absorbing characteristic or a light attenuation characteristic.

16. An image reading apparatus comprising:
   a contact type image sensor device being in contact with a document fed by a conveyor system and optically reading said document;
   a platen roller pushing said document against a surface of said contact type image sensor device;
   a frame supporting said contact type image sensor device, said frame having a mounting surface to which said contact type image sensor device is fixed and a side wall which rises from said mounting surface in the vicinity of said contact type image sensor device on the side on which said document is fed to said contact type image sensor device, a gap being formed between said contact type image sensor device and said side wall; and a thin plate guiding said document so as to feed said document into a narrow space formed between said platen roller and said contact type image sensor device from above a surface of said contact type image sensor device, a distal end of said thin plate being positioned above said gap;

wherein said thin plate has electroconductivity and is grounded.

17. An image reading apparatus as claimed in claim 16 wherein the ratio between the width of said contact type image sensor device and the diameter of said platen roller is within a range of from 1:4 to 1:10.

18. An image reading apparatus comprising:

a contact type image sensor device being in contact with a document fed by a conveyor system and optically reading said document;

a platen roller pushing said document against a surface of said contact type image sensor device;

a frame supporting said contact type image sensor device, said frame having a mounting surface to which said contact type image sensor device is fixed and a side wall which rises from said mounting surface in the vicinity of said contact type image sensor device on the side on which said document is fed to said contact type image sensor device, a gap being formed between said contact type image sensor device and said side wall; and a thin plate guiding said document so as to feed said document into a narrow space formed between said platen roller and said contact type image sensor device from above a surface of said contact type image sensor device, a distal end of said thin plate being positioned above said gap;

wherein the distal end of said thin plate has a convex surface which faces an outer surface of said platen roller.

19. An image reading apparatus as claimed in claim 18 wherein said curved surface is formed by bending the distal end of said thin plate.

20. An image reading apparatus as claimed in claim 18 wherein said curved surface is formed by chamfering an edge of the distal end of said thin plate.

21. An image reading apparatus as claimed in claim 18 wherein the ratio between the width of said contact type image sensor device and the diameter of said platen roller is within a range of from 1:4 to 1:10.

22. An image reading apparatus comprising:

a contact type image sensor device being in contact with a document fed by a conveyor system and optically reading said document;

a platen roller pushing said document against a surface of said contact type image sensor device;

a frame supporting said contact type image sensor device, said frame having a mounting surface to which said contact type image sensor device is fixed and a side wall which rises from said mounting surface in the vicinity of said contact type image sensor device on the side on which said document is fed to said contact type image sensor device, a gap being formed between said contact type image sensor device and said side wall; and a thin plate guiding said document so as to feed said document into a narrow space formed between said platen roller and said contact type image sensor device from above a surface of said contact type image sensor device, a distal end of said thin plate being positioned above said gap;

wherein said thin plate is inclined so as to rise from the surface of said contact type image sensor device.

23. An image reading apparatus as claimed in claim 22 wherein an angle of inclination of said thin plate is within the range of from 0° to 10°.

24. An image reading apparatus as claimed in claim 22 wherein the ratio between the width of said contact type image sensor device and the diameter of said platen roller is within a range of from 1:4 to 1:10.

* * * * *